(12) United States Patent
Ji et al.

(10) Patent No.: US 11,418,354 B2
(45) Date of Patent: Aug. 16, 2022

(54) AUTHENTICATION METHOD, DEVICE, AND SYSTEM

(71) Applicant: XFUSION DIGITAL TECHNOLOGIES CO., LTD., Zhengzhou (CN)

(72) Inventors: Yeyi Ji, Nanjing (CN); Liang Zang, Nanjing (CN); Wenjuan Cai, Nanjing (CN); Yulei Zhang, Nanjing (CN)

(73) Assignee: XFUSION DIGITAL TECHNOLOGIES CO., LTD., Zhengzhou (CN)

( * ) Notice: Subject to any disclaimer, the term of this patent is extended or adjusted under 35 U.S.C. 154(b) by 151 days.

(21) Appl. No.: 16/906,572

(22) Filed: Jun. 19, 2020

(65) Prior Publication Data
US 2020/0322174 A1    Oct. 8, 2020

Related U.S. Application Data

(63) Continuation of application No. PCT/CN2018/113932, filed on Nov. 5, 2018.

(30) Foreign Application Priority Data

Dec. 27, 2017    (CN) .......................... 201711451058.8

(51) Int. Cl.
*H04L 29/06*    (2006.01)
*H04L 9/32*    (2006.01)
(Continued)

(52) U.S. Cl.
CPC ............ *H04L 9/3268* (2013.01); *H04L 9/006* (2013.01); *H04L 9/0825* (2013.01);
(Continued)

(58) Field of Classification Search
CPC ..... H04L 9/3268; H04L 9/006; H04L 9/0825; H04L 9/3247; H04L 63/0823;
(Continued)

(56) References Cited

U.S. PATENT DOCUMENTS 5,809,233 A * 9/1998 Shur ................. H04Q 11/0478
370/402
5,822,320 A * 10/1998 Horikawa .......... H04Q 11/0478
370/254
(Continued)

FOREIGN PATENT DOCUMENTS

CA    2367397 A1 *  9/2000
CN    102316605 A    1/2012
(Continued)

OTHER PUBLICATIONS

Detienne M Kumar M Sullenberger Cisco F:"Flexible Dynamic Mesh UPN;draft-detienne-dmvpn-01.txt", Flexible Dynamic Mesh UPN;DRAFT-DETIENNE-DMUPN-01.TXT, Internet Engineering Task Force, IETF; StandardWorkingDraft, Internet Society (ISOC) 4, Rue Des Falaises CH-1205 Geneua, Switzerland,Dec. 20, 2013 (Dec. 20, 2013), pp. 1-32,XP015097699.
(Continued)

*Primary Examiner* — Sher A Khan
(74) *Attorney, Agent, or Firm* — Rimon PC

(57) ABSTRACT

This application provides an authentication method and related device and system. The method includes sending, by a first network device, a first next-hop resolution protocol (NHRP) registration request message to the second network device, where the first NHRP registration request message is used to request the second network device to perform digital certificate authentication on the first network device, and the first NHRP registration request message includes first PKI certificate information. The method may further include receiving, by the first network device, a first NHRP regis-
(Continued)

tration reply message indicating that the digital certificate authentication performed by the second network device succeeds. In this way, authentication is performed between a spoke device and a hub device using a PKI certificate. This helps reducing authentication workload and improving authentication security.

13 Claims, 7 Drawing Sheets

(51) Int. Cl.
  *H04L 9/00* (2022.01)
  *H04L 9/08* (2006.01)
  *H04L 9/40* (2022.01)
(52) U.S. Cl.
  CPC .......... *H04L 9/3247* (2013.01); *H04L 63/083* (2013.01); *H04L 63/0823* (2013.01)
(58) Field of Classification Search
  CPC . H04L 63/083; H04L 9/00; H04L 9/08; H04L 9/32; H04L 29/06
  See application file for complete search history.

(56) References Cited

U.S. PATENT DOCUMENTS

| | | | | |
|---|---|---|---|---|
| 6,483,832 | B1* | 11/2002 | Civanlar | H04Q 11/0478 370/432 |
| 7,447,901 | B1* | 11/2008 | Sullenberger | H04L 63/0272 713/153 |
| 9,166,969 | B2* | 10/2015 | Hershberg | H04L 63/0823 |
| 2004/0095947 | A1* | 5/2004 | Luciani | H04L 12/4608 370/410 |
| 2007/0206597 | A1* | 9/2007 | Asati | H04L 45/00 370/392 |
| 2010/0161969 | A1* | 6/2010 | Grebovich | H04L 9/3247 713/176 |
| 2017/0012870 | A1 | 1/2017 | Blair et al. | |
| 2017/0034137 | A1* | 2/2017 | Pillai | H04L 9/0844 |

FOREIGN PATENT DOCUMENTS

| | | |
|---|---|---|
| CN | 105325020 A | 2/2016 |
| CN | 106341255 A | 1/2017 |
| CN | 107306198 A | 10/2017 |

OTHER PUBLICATIONS

Michael Rossberg et al:"A survey on automatic configuration of virtual private networks". Computer Networks, Elsevier, Amsterdam, NL, vol. 55. No. 8, Jan. 5, 2011 (Jan. 5, 2011), pp. 1684-1699, XP028203871.
Cisco:"Scalable DMUPN Design and Implementation Guide",Dec. 31, 2007 (Dec. 31, 2007),Retrieved from the Internet:URL:https:// www.cisco.com/c/dam/en/us/products/collateral/security/dynamic-multipoint-vpn-dmvpn/dmvpn_design_guide.pdf#wp37674, pp. 24-25, XP055520802.
K. Van Den Hout, et al., "Management of IP numbers by peg-dhcp," Network Working Group, Request for Comments: 2322, Apr. 1, 1998, total 7 pages.
J. Luciani et al,"NBMA Next Hop Resolution Protocol (NHRP)", Network Working Group, Request for Comments: 2332, Category: Standards Track, Apr. 1, 1998, total 52 pages.
Zhang Jing,"The Design and Implementation of Next Hop Resolution Client Base on NHRP Protocol", A thesis submitted to Xidian University in partial fulfillment of the requirements for the degree of Master in Software Engineering, Dec. 1, 2015, total 90 pages. With an English Abstract.
Dayananda M S,"Architecture for inter-cloud services using IPsec VPN", 2012 Second International Conference on Advanced Computing and Communication Technologies, Jan. 1, 2012, total 5 pages.

\* cited by examiner

| C | U | Type (Type) | Length (Length) |
|---|---|---|---|
| Data (Data) ||||

| Fixed part (fixed part) | Mandatory part (mandatory part) | Authentication extension (authentication extension) | Certificate extension (certificate extension) |
|---|---|---|---|

AUTHENTICATION METHOD, DEVICE, AND SYSTEM

CROSS-REFERENCE TO RELATED APPLICATIONS

This application is a continuation of International Application No. PCT/CN2018/113932, filed on Nov. 5, 2018, which claims priority to Chinese Patent Application No. 201711451058.8, filed on Dec. 27, 2017. The disclosures of the aforementioned applications are hereby incorporated by reference in their entireties.

TECHNICAL FIELD

This application relates to the field of communications technologies, and in particular, to an authentication method, and related device and system.

BACKGROUND

A next hop resolution protocol (NHRP) is also referred to as a non-broadcast multiple access next hop resolution protocol (NBMA NHRP). The NHRP is used by a source station (a host or a router) connected to an NBMA subnet to determine an internetworking layer address for reaching a target station and to determine an NBMA subnet address of an "NBMA next hop". If a destination is connected to the NBMA subnet, the NBMA next hop is the target station. If a destination is not connected to the NBMA subnet, the NBMA next hop is an egress router that is in the NBMA subnet and that is closest to the target station. The NHRP is designed for use in a multi-protocol internetworking layer environment in the NBMA subnet.

In an implementation scenario, the NHRP and generic routing encapsulation (GRE) may form a multipoint GRE (mGRE) interworking solution. In other words, in an NHRP network, interworking between NHRP sites is implemented through an mGRE tunnel. The mGRE tunnel enables one GRE interface to support a plurality of GRE tunnels. This simplifies configuration complexity. The GRE tunnel also supports internet protocol (IP) multicast and a non-IP protocol.

For example, in an NHRP network scenario, the NHRP network may include a hub device and a spoke device. Interworking between the hub device and the spoke device may be implemented through an mGRE tunnel.

In an actual application scenario, the spoke device in the NHRP network needs to register with the hub device, and password authentication is required during registration. However, when an authentication password between the spoke device and the hub device needs to be changed, or when a topology of the NHRP network changes, the workload of authentication password configuration is increased, reducing network security.

SUMMARY

In view of this, embodiments of this application provide an authentication method, a device, and a system. In an NHRP network, authentication is performed between a spoke device and a hub device by using a public key infrastructure (PKI) certificate. This helps reduce workload of authentication configuration and improve authentication security.

Technical solutions provided in the embodiments of this application are as follows:

According to a first aspect, an authentication method is provided. The authentication method is applied to an NHRP network, and the NHRP network includes a first network device and a second network device. The method includes: sending, by the first network device, a first NHRP registration request message to the second network device, where the first NHRP registration request message is used to request the second network device to perform digital certificate authentication on the first network device, and the first NHRP registration request message includes first PKI certificate information; and receiving, by the first network device, a first NHRP registration reply message sent by the second network device, where the first NHRP registration reply message is used to indicate that the digital certificate authentication performed by the second network device on the first network device succeeds.

Based on the solution provided in this embodiment, in the NHRP network, authentication is performed between a spoke device and a hub device using a PKI certificate. This helps reduce workload of authentication configuration and improve authentication security.

In a possible implementation of the first aspect, the first PKI certificate information includes a first digital certificate, a first digital signature, and a first public key, the first NHRP registration request message includes a first authentication extension field and a first certificate extension field, the first authentication extension field includes the first digital signature, and the first certificate extension field includes the first digital certificate and the first public key. Before the sending, by the first network device, of a first NHRP registration request message to the second network device, the method further includes: determining, by the first network device, a first digest based on a fixed part field and a mandatory part field, where the first NHRP registration request message includes the fixed part field and the mandatory part field; and encrypting, by the first network device, the first digest by using a first private key, to obtain the first digital signature, where the first private key is symmetric to the first public key.

In another possible implementation of the first aspect, the method further includes: receiving, by the first network device, a second NHRP registration request message sent by the second network device, where the second NHRP registration request message is used to request the first network device to perform digital certificate authentication on the second network device, and the second NHRP registration request message includes second PKI certificate information; determining, by the first network device based on the second PKI certificate information, that the digital certificate authentication performed on the second network device succeeds; and sending, by the first network device, a second NHRP registration reply message to the second network device, where the second NHRP registration reply message indicates that the digital certificate authentication performed by the first network device on the second network device succeeds.

In still another possible implementation of the first aspect, the second PKI certificate information includes a second digital certificate, a second digital signature, and a second public key. The determining, by the first network device based on the second PKI certificate information, that the digital certificate authentication performed on the second network device succeeds includes: determining, by the first network device, a second digest based on a fixed part field and a mandatory part field that are carried in the second NHRP registration request message; decrypting, by the first network device, the second digital signature based on the second public key, to obtain a third digest; and determining, by the first network device, that the second digest is the same as the third digest, and determining that the second digital certificate information included in the second PKI certificate information and the first digital certificate stored in the first network device belong to a same certificate chain.

Optionally, the second NHRP registration request message includes a second authentication extension field and a second certificate extension field. The second authentication extension field includes the second digital signature, and the second certificate extension field includes the second digital certificate and the second public key.

According to a second aspect, an authentication method is provided. The authentication method is applied to an NHRP network, and the NHRP network includes a first network device and a second network device. The method includes: receiving, by the second network device, a first NHRP registration request message sent by the first network device, where the first NHRP registration request message is used to request the second network device to perform digital certificate authentication on the first network device, and the first NHRP registration request message includes first PKI certificate information; determining, by the second network device based on the first PKI certificate information, that the digital certificate authentication performed on the first network device succeeds; and sending, by the second network device, a first NHRP registration reply message to the first network device, where the first NHRP registration reply message indicates that the digital certificate authentication performed by the second network device on the first network device succeeds.

Based on the solution provided in this embodiment, in the NHRP network, authentication is performed between a spoke device and a hub device by using a PKI certificate. This helps reduce workload of authentication configuration and improve authentication security.

In a possible implementation of the second aspect, the first PKI certificate information includes a first digital certificate, a first digital signature, and a first public key. The first NHRP registration request message includes a first authentication extension field and a first certificate extension field. The first authentication extension field includes the first digital signature, and the first certificate extension field includes the first digital certificate and the first public key. The determining, by the second network device based on the first PKI certificate information, that the digital certificate authentication performed on the first network device succeeds includes: determining, by the second network device, a first digest based on a fixed part field and a mandatory part field that are carried in the first NHRP registration request message; decrypting, by the second network device, the first digital signature based on the first public key, to obtain a second digest; and determining, by the second network device, that the first digest is the same as the second digest, and determining that the first digital certificate included in the first PKI certificate information and a second digital certificate stored in the second network device belong to a same certificate chain.

In another possible implementation of the second aspect, the method further includes: sending, by the second network device, a second NHRP registration request message to the first network device, where the second NHRP registration request message is used to request the first network device to perform digital certificate authentication on the second network device, and the second NHRP registration request message includes second PKI certificate information; and receiving, by the second network device, a second NHRP registration reply message sent by the first network device, where the second NHRP registration reply message is used to indicate that the digital certificate authentication performed by the first network device on the second network device succeeds.

In the first aspect or the second aspect, optionally, the second NHRP registration request message and the first NHRP registration reply message are a same message.

According to a third aspect, a first network device is provided. The first network device has a function of implementing behavior of the first network device in the foregoing method. The function may be implemented by using hardware, or may be implemented by hardware by executing corresponding software. The hardware or the software includes one or more devices, units, or modules corresponding to the foregoing function.

In a possible design, a structure of the first network device includes a processor and an interface. The processor is configured to support the first network device in performing a corresponding function in the foregoing method. The interface is configured to: support communication between the first network device and a second network device; and send information or an instruction in the foregoing method to the second network device, or receive information or an instruction in the foregoing method from the second network device. The first network device may further include a memory. The memory is coupled to the processor, and the memory stores a program instruction and data for the first network device.

In another possible design, the first network device includes a processor, a transmitter, a receiver, a random access memory, a read-only memory, and a bus. The processor is separately coupled to the transmitter, the receiver, the random access memory, and the read-only memory by using the bus. When the first network device is initialized, a bootloader in a basic input/output system or an embedded system that is built into the read-only memory is used to boot a system to start, and boot the first network device to enter a normal running state. After the first network device enters the normal running state, an application program and an operating system are stored in the random access memory, to enable the processor to perform the method in any one of the first aspect or the possible implementations of the first aspect.

According to a fourth aspect, a first network device is provided. The first network device includes a main control board and an interface board, and may further include a switching board. The first network device is configured to perform the method in any one of the first aspect or the possible implementations of the first aspect. Specifically, the first network device includes modules or devices or hardware parts configured to perform the method in any one of the first aspect or the possible implementations of the first aspect.

According to a fifth aspect, a first network device is provided. The first network device includes a controller and a first forwarding sub-device. The first forwarding sub-device includes an interface board, and may further include a switching board. The first forwarding sub-device is configured to perform a function of the interface board in the fourth aspect, and may further perform a function of the switching board in the fourth aspect. The controller includes a receiver, a processor, a transmitter, a random access memory, a read-only memory, and a bus. The processor is separately coupled to the receiver, the transmitter, the random access memory, and the read-only memory by using the bus. When the controller is initialized, a bootloader in a basic input/output system or an embedded system that is built into the read-only memory is used to boot a system to start, and boot the controller to enter a normal running state. After the controller enters the normal running state, an application program and an operating system are stored in the random access memory, to enable the processor to perform a function of the main control board in the fourth aspect.

According to a sixth aspect, a computer storage medium is provided and is configured to store a program, code, or an instruction used by the foregoing first network device, and when a processor or a hardware device executes the program, the code, or the instruction, functions or steps of the first network device in the foregoing aspects may be completed.

According to a seventh aspect, a second network device is provided. The second network device has a function of implementing behavior of the second network device in the foregoing method. The function may be implemented by using hardware, or may be implemented by hardware by executing corresponding software. The hardware or the software includes one or more devices, units, or modules corresponding to the foregoing function.

In a possible design, a structure of the second network device includes a processor and an interface. The processor is configured to support the second network device in performing a corresponding function in the foregoing method. The interface is configured to: support communication between the second network device and a first network device; and send information or an instruction in the foregoing method to the first network device, or receive information or an instruction in the foregoing method from the first network device. The second network device may further include a memory. The memory is coupled to the processor, and the memory stores a program instruction and data that are necessary for the second network device.

In another possible design, the second network device includes a processor, a transmitter, a receiver, a random access memory, a read-only memory, and a bus. The processor is separately coupled to the transmitter, the receiver, the random access memory, and the read-only memory by using the bus. When the second network device needs to run, a bootloader in a basic input/output system or an embedded system that is built into the read-only memory is used to boot a system to start, and boot the second network device to enter a normal running state. After the second network device enters the normal running state, an application program and an operating system are stored in the random access memory, to enable the processor to perform the method in any one of the second aspect or the possible implementations of the second aspect.

According to an eighth aspect, a second network device is provided. The second network device includes a main control board and an interface board, and may further include a switching board. The second network device is configured to perform the method in any one of the second aspect or the possible implementations of the second aspect. Specifically, the second network device includes modules configured to perform the method in any one of the second aspect or the possible implementations of the second aspect.

According to a ninth aspect, a second network device is provided. The second network device includes a controller and a second forwarding sub-device. The second forwarding sub-device includes an interface board, and may further include a switching board. The second forwarding sub-device is configured to perform a function of the interface board in the eighth aspect, and may further perform a function of the switching board in the eighth aspect. The controller includes a receiver, a processor, a transmitter, a random access memory, a read-only memory, and a bus. The processor is separately coupled to the receiver, the transmitter, the random access memory, and the read-only memory by using the bus. When the controller needs to be initialized, a bootloader in a basic input/output system or an embedded system that is built into the read-only memory is used to boot a system to start, and boot the controller to enter a normal running state. After the controller enters the normal running state, an application program and an operating system are stored in the random access memory, to enable the processor to perform a function of the main control board in the eighth aspect.

According to a tenth aspect, a computer storage medium is provided and is configured to store a program, code, or an instruction used by the foregoing second network device, and when a processor or a hardware device executes the program, the code, or the instruction, functions or steps of the second network device in the foregoing aspects may be completed.

According to an eleventh aspect, an NHRP network system is provided. The NHRP network system includes a first network device and a second network device. The first network device is the first network device in the third aspect, the fourth aspect, or the fifth aspect, and the second network device is the second network device in the seventh aspect, the eighth aspect, or the ninth aspect.

According to the foregoing solutions, the authentication method, the device, and the system are provided in the embodiments of this application. In an NHRP network, digital certificate authentication is performed between a spoke device and a hub device by using a PKI certificate. The spoke device and the hub device automatically generate local digital certificates and corresponding certificate chains based on a digital certificate issued by a PKI certificate server. This reduces workload of authentication configuration. In addition, the spoke device and the hub device may process an NHRP registration request message through certificate chain matching and encryption and decryption. This improves authentication security. In addition, when a topology of the NHRP network changes, the spoke device and the hub device do not need to be reconfigured.

DESCRIPTION OF EMBODIMENTS

The following separately provides detailed descriptions by using specific embodiments.

Figure 1:
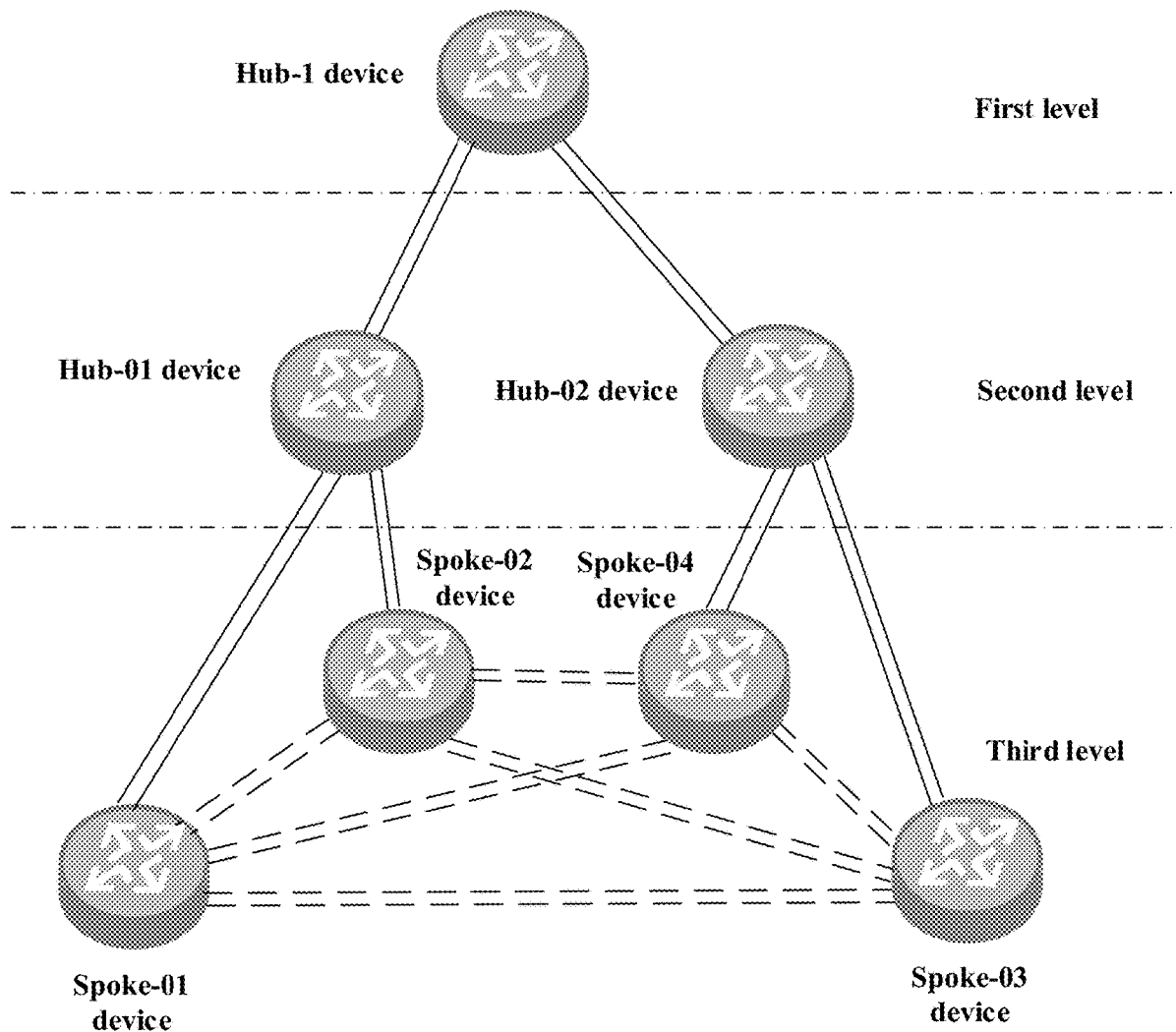
FIG. 1 is a schematic structural diagram of an NHRP network according to an embodiment of this application.

FIG. 1 is a schematic structural diagram of an NHRP network according to an embodiment of this application. As shown in FIG. 1, the NHRP network includes a three-level cascading structure. The first level includes a hub-1 device, the second level includes a hub-01 device and a hub-02 device, and the third level includes a spoke-01 device, a spoke-02 device, a spoke-03 device, and a spoke-04 device. Through an mGRE tunnel, communication is performed between a network device at the first level and a network device at the second level, between a network device at the second level and a network device at the third level, and between network devices at the third level. The hub device and the spoke device in FIG. 1 each may be a router or a layer-3 switch. In the three-level cascading structure shown in FIG. 1, the hub-01 device and the hub-02 device are lower-level devices of the hub-1 device included at the first level. The spoke-01 device, the spoke-02 device, the spoke-03 device, and the spoke-04 device are lower-level devices of the hub-01 device and the hub-02 device.

It should be understood that FIG. 1 schematically shows a three-level cascading structure. In an actual network scenario, a two-level cascading structure or a cascading structure with more than three levels for example, a four-level cascading structure, may be used. In addition, at each level, a quantity of network devices is not limited, and may be any quantity. For example, by deleting the first level, the network structure shown in FIG. 1 may be transformed into a two-level cascading structure. In the two-level cascading structure, the first level includes a hub-01 device and a hub-02 device, and the second level includes a spoke-01 device, a spoke-02 device, a spoke-03 device, and a spoke-04 device. For another example, by adding a fourth level, the network structure shown in FIG. 1 may be transformed into a four-level cascading structure. In the four-level cascading structure, the structures of a first level, a second level, and a third level are shown in FIG. 1. The fourth level is a lower level of the third level, and the fourth level includes at least one spoke device. In this way, a spoke device at the third level may be considered as a hub device of the spoke device at the fourth level. In FIG. 1, the type of a tunnel between network devices is not limited. For example, a point-to-multipoint virtual extensible local area network (VXLAN) tunnel may be used.

The hub-01 device and the hub-02 device in FIG. 1 are hub devices in relation to the spoke devices at the third level, and are spoke devices in relation to the hub-1 device at the first level. Therefore, the spoke device is a lower-level network device of the hub device. Each spoke device may be connected to one or more terminal devices. For example, the spoke-01 device is connected to three terminal devices. The spoke device at the third level may be further connected to a spoke device at a lower level. For example, FIG. 1 further includes a fourth level, and the fourth level includes a spoke-001 device and a spoke-002 device. The spoke-001 device and the spoke-002 device communicate with the spoke-01 device at the third level. In this way, the spoke-01 device is a spoke device in relation to the hub-01 device, and is a hub device in relation to the spoke-001 device and the spoke-002 device.

In the NHRP network, the spoke device needs to register with the hub device. Using FIG. 1 as an example, the hub-01 device and the hub-02 device are spoke devices of the hub-1 device. Therefore, the hub-01 device and the hub-02 device need to register with the hub-1 device. The spoke-01 device, the spoke-02 device, the spoke-03 device, and the spoke-04 device are spoke devices of the hub-01 device and the hub-02 device. Therefore, the spoke-01 device, the spoke-02 device, the spoke-03 device, and the spoke-04 device need to register with the hub-01 device and the hub-02 device.

When the spoke device registers with the hub device, registration may be performed through password authentication. In a possible implementation, all spoke devices and hub devices in the NHRP network use a same password. In this manner, although configuration workload can be reduced, security cannot be ensured. In another possible implementation, network devices at each level in the NHRP network use a same password. Compared with the foregoing manner, in this manner, although security is properly improved, configuration workload increases. In addition, if a topology of the NHRP network is updated, configuration workload increases even more. For example, when the spoke-01 device at the third level in FIG. 1 changes to a hub device at the second level, an administrator needs to reconfigure a password of the spoke-01 device, and needs to learn of the password corresponding to the second level. Further, due to continuously increased complexity of the NHRP network, a quantity of network devices in the NHRP network continuously increases. Therefore, the disadvantages in the foregoing two implementations are amplified.

In an implementation of this application, authentication is performed between the spoke device and the hub device by using a public key infrastructure (PKI) certificate. For example, the NHRP network shown in FIG. 1 further includes a PKI certificate server (not shown in FIG. 1). The PKI certificate server separately communicates with the network device at the first level, the network device at the second level, and the network device at the third level. The PKI certificate server separately issues digital certificates to the network device at the first level, the network device at the second level, and the network device at the third level. When the spoke device registers with the hub device, the spoke device sends an NHRP registration request message to the hub device. The NHRP registration request message carries PKI certificate information, and the NHRP registration request message is used by the spoke device to request digital certificate authentication from the hub device. After receiving the NHRP registration request message, the hub device determines, based on the PKI certificate information in the NHRP registration request message, whether authentication performed on the spoke device succeeds. If the authentication performed by the hub device on the spoke device succeeds, the hub device sends an NHRP registration reply message to the spoke device. The NHRP registration reply message is used to indicate that the digital certificate authentication performed by the hub device on the spoke device succeeds. After the spoke device receives the NHRP registration reply message, the spoke device and the hub device can start to transmit data packets.

In a possible implementation, the spoke device and the hub device may further perform bidirectional digital certificate authentication according to the foregoing similar implementation. In other words, the spoke device performs digital certificate authentication on the hub device, and the hub device further performs digital certificate authentication on the spoke device. After the bidirectional digital certificate authentication succeeds, the spoke device and the hub device can start to transmit data packets.

In the foregoing implementation, in the NHRP network, the digital certificate authentication is performed between the spoke device and the hub device by using the PKI certificate. The spoke device and the hub device automatically generate local digital certificates and corresponding certificate chains based on a digital certificate issued by the PKI certificate server. This reduces the workload of authentication configuration. In addition, the spoke device and the hub device may process the NHRP registration request message through certificate chain matching and encryption and decryption. This improves authentication security. In addition, when the topology of the NHRP network changes, the spoke device and the hub device do not need to be reconfigured. For a specific implementation in which the spoke device performs digital certificate authentication on the hub device, refer to the descriptions of subsequent embodiments of this application.

Figure 2:
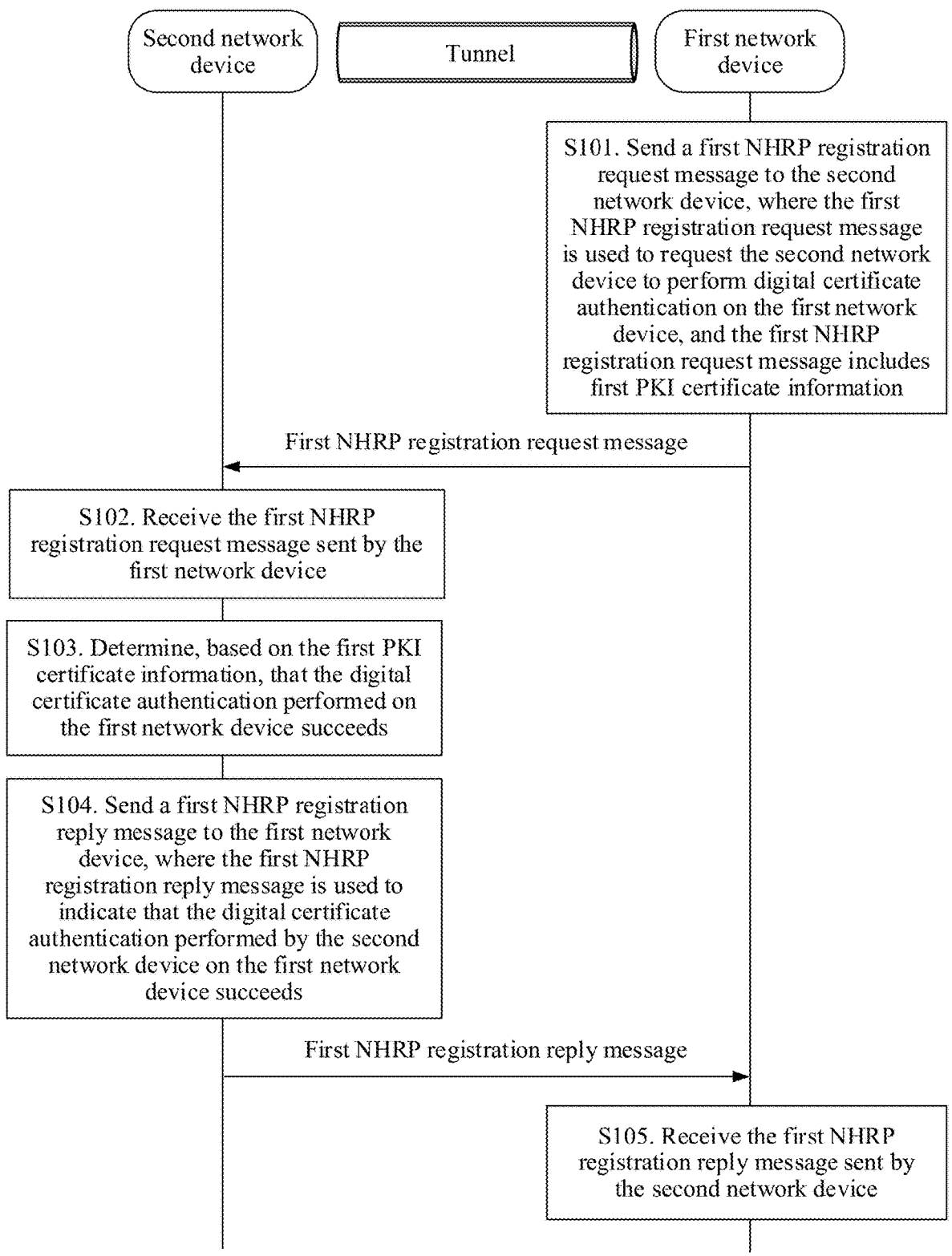
FIG. 2 is a flowchart of an authentication method according to an embodiment of this application.

FIG. 2 is a flowchart of an authentication method according to an embodiment of this application. The method shown in FIG. 2 may be applied to the NHRP network shown in FIG. 1. The NHRP network includes a first network device and a second network device. For example, in FIG. 1, the first network device may be a spoke device, and the second network device may be a hub device. Specifically, when digital certificate authentication is performed between the network device at the third level and the network device at the second level, the first network device may be the spoke-01 device, the spoke-02 device, the spoke-03 device, or the spoke-04 device, and the second network device may be the hub-01 device or the hub-02 device. When digital certificate authentication is performed between the network device at the second level and the network device at the first level, the first network device may be the hub-01 device or the hub-02 device, and the second network device may be the hub-1 device. The method shown in FIG. 2 includes S101 to S105.

S101. The first network device sends a first NHRP registration request message to the second network device, where the first NHRP registration request message is used to request the second network device to perform digital certificate authentication on the first network device, and the first NHRP registration request message includes first PKI certificate information.

For example, the first network device is the spoke device, the second network device is the hub device, and the first network device is a lower-level device of the second network device. Before transmitting a data packet, the spoke device needs to register with the hub device. In an implementation of this application, in a process in which the spoke device registers with the hub device, digital certificate authentication performed by the hub device on the spoke device is implemented. Specifically, the spoke device generates the first NHRP registration request message. The first NHRP registration request packet carries the first PKI certificate information. The first NHRP registration request message is used by the spoke device to request the digital certificate authentication from the hub device. After generating the first NHRP registration request message, the spoke device sends the first NHRP registration request message to the hub device.

Figures 3, 4, 5:
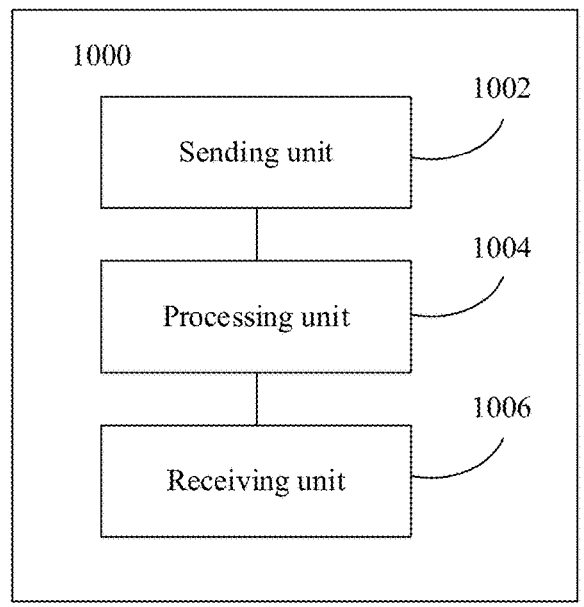
FIG. 3 is a diagram of a packet format of a certificate extension field according to an embodiment of this application.
FIG. 4 is a diagram of a packet format of an NHRP registration request message according to an embodiment of this application.
FIG. 5 is a schematic structural diagram of a first network device according to an embodiment of this application.

For example, the first PKI certificate information includes a first digital certificate, a first digital signature, and a first public key. The first NHRP registration request message may include a first authentication extension field and a first certificate extension field. Optionally, the first authentication extension field includes the first digital signature, and the first certificate extension field includes the first digital certificate and the first public key. For a format of the first certificate extension field, refer to FIG. 3. As shown in FIG. 3, a flag C indicates "compulsory", and specifically indicates whether the certificate extension field is identified by a receiving party. For example, when the flag C is set to 1, it indicates that the certificate extension field needs to be identified by the receiving party. U indicates a reserved field. "Type" indicates a type of an extension field. For example, if "type"=11, it indicates that the type of the extension field is the certificate extension field. "Length" indicates a length of an extension payload. "Data" is a payload part of the certificate extension field. For example, "data" is used to carry the first digital certificate and the first public key. Similarly, a format of the first authentication extension field is the same as the format of the first certificate extension field. Details are not described herein again. The first digital signature is carried in "data" of the first authentication extension field.

The first NHRP registration request message may further include a fixed part (fixed part) field and a mandatory part field. For a format of the first NHRP registration request message, refer to FIG. 4. For specific formats of the fixed part field and the mandatory part field, refer to related definitions in internet engineering task force (IETF) request for comments (RFC) 2332.

The first digital certificate is from a PKI certificate server. Specifically, the first digital certificate may include a local certification authority (CA) digital certificate, a cascading CA digital certificate, and a root CA digital certificate. In addition, the first digital certificate further includes an association relationship among the local CA digital certificate, the cascading CA digital certificate, and the root CA digital certificate. This association relationship may be referred to as a certificate chain. The root CA digital certificate is a CA digital certificate issued by the PKI certificate server. Both the cascading CA digital certificate and the local CA digital certificate are CA digital certificates derived from the root CA digital certificate. The cascading CA digital certificate is used to indicate a CA digital certificate corresponding to a level (the first level, the second level, or the third level) in the NHRP network. The local CA digital certificate is used to indicate a CA digital certificate corresponding to a network device in the NHRP network. There may be a plurality of cascading CA digital certificates. For example, digital certificates of the hub-01 device in FIG. 1 include a local CA digital certificate, cascading CA digital certificates, and a root CA digital certificate. The cascading CA digital certificates include a cascading CA digital certificate 1 and a cascading CA digital certificate 2. The cascading CA digital certificate 1 is a cascading CA digital certificate in digital certificates of the hub-1 device, and the cascading CA digital certificate 2 is a local CA digital certificate in the digital certificates of the hub-1 device.

Optionally, the first digital signature may be implemented in S201 and S202.

S201. The first network device determines a first digest based on the fixed part field and the mandatory part field. The first NHRP registration request message includes the fixed part field and the mandatory part field.

S202. The first network device encrypts the first digest by using a first private key, to obtain the first digital signature. The first private key is symmetric to the first public key.

For example, in a process in which the spoke device generates the first NHRP registration request message, the spoke device combines the fixed part field and the mandatory part field. The combining operation may be that a value included in the fixed part field and a value included in the mandatory part field are spliced in a head-to-tail manner, to obtain a combined value. Then, the spoke device performs a hash operation on the combined value to obtain the first digest.

After determining the first digest, the spoke device uses the first private key to encrypt the first digest. Specifically, the first digital certificate includes an encryption algorithm identifier, and the encryption algorithm identifier is used to identify an encryption algorithm. A plurality of encryption algorithms are configured for the spoke device. The spoke device determines a corresponding encryption algorithm by identifying the encryption algorithm identifier in the first digital certificate. In another implementation, the first digital certificate includes no encryption algorithm identifier, and only one encryption algorithm is configured for the spoke device. It should be understood that a setting manner of an encryption algorithm of the hub device in the NHRP network is consistent with that of the foregoing spoke device. Details are not described herein again. The encryption algorithm may be, for example, a data encryption standard (DES), a triple data encryption standard (3DES), or an advanced encryption standard 128 (AES128). After obtaining the encryption algorithm, the spoke device encrypts the first digest by using the encryption algorithm and the first private key, to obtain the first digital signature. The first private key is generated by the spoke device according to a key generation algorithm. When generating the first private key, the spoke device further generates the first public key symmetric to the first private key. After the first NHRP registration request message is transmitted to the hub device, the first public key is used by the hub device to decrypt the first digital signature.

S102. The second network device receives the first NHRP registration request message sent by the first network device.

S103. The second network device determines, based on the first PKI certificate information, that the digital certificate authentication performed on the first network device succeeds.

For example, the hub device receives the first NHRP registration request message sent by the spoke device. According to the foregoing implementation, the spoke device communicates with the hub device through a tunnel, to transmit the first NHRP registration request message. In a possible implementation, the tunnel in the NHRP network is implemented based on an mGRE tunnel. Specifically, the hub device receives, through an mGRE tunnel, the first NHRP registration request message sent by the spoke device. The first NHRP registration request message is encapsulated by the spoke device into a GRE packet, and is sent to the hub device through the GRE tunnel. In another possible implementation, the tunnel in the NHRP network is implemented based on a point-to-multipoint VXLAN tunnel. Specifically, the hub device receives, through the VXLAN tunnel, the first NHRP registration request message sent by the spoke device. The first NHRP registration request message is encapsulated by the spoke device into a VXLAN packet, and is sent to the hub device through the VXLAN tunnel.

After receiving the first NHRP registration request message, the hub device obtains the first PKI certificate information from the first NHRP registration request message. The hub device determines, based on the first PKI certificate information, whether digital certificate authentication performed by the hub device on the spoke device succeeds.

According to the foregoing implementation, the first PKI certificate information includes the first digital certificate, the first digital signature, and the first public key. Optionally, that the second network device determines, based on the first PKI certificate information, that the digital certificate authentication performed on the first network device succeeds may include S301 to S303.

S301. The second network device determines a second digest based on the fixed part field and the mandatory part field that are carried in the first NHRP registration request message.

S302. The second network device decrypts the first digital signature based on the first public key, to obtain the first digest.

S303. The second network device determines that the first digest is the same as the second digest, and determines that the first digital certificate included in the first PKI certificate information and a second digital certificate stored in the second network device belong to a same certificate chain.

For example, according to the foregoing implementation, the first NHRP registration request message includes the fixed part field and the mandatory part field. After obtaining the first NHRP registration request message, the hub device determines the second digest based on the fixed part field and the mandatory part field that are carried in the first NHRP registration request message. In other words, similar to that in the foregoing implementation of S201, the hub device combines the fixed part field and the mandatory part field to obtain a combined value, and then performs a hash operation on the combined value to obtain the second digest. For a specific implementation, refer to the foregoing description of S201. Details are not described herein again.

The first public key included in the first PKI certificate information is symmetric to the first private key used by the spoke device to generate the first digital signature. Therefore, the hub device may decrypt the first digital signature based on the first public key, to obtain the first digest. The foregoing decryption process is a reverse operation of the encryption operation. The implementation is similar to a specific explanation of the foregoing S202. Details are not described herein again. It should be noted that the encryption algorithm identifier in S202 is referred to as a decryption algorithm identifier in the decryption operation. The hub device can determine a corresponding decryption algorithm by using the identifier. In addition, when there is only one algorithm, no decryption algorithm identifier is needed.

The hub device determines whether the second digest obtained through calculation is the same as the first digest obtained through decryption. In addition, the hub device further determines that the first digital certificate included in the first PKI certificate information and the second digital certificate stored in the second network device belong to the same certificate chain. If the hub device determines that the first digest is the same as the second digest, and determines that the first digital certificate included in the first PKI certificate information and the second digital certificate stored in the second network device belong to the same certificate chain, the hub device may determine that the authentication performed on the spoke device succeeds.

For an implementation in which the hub device determines whether the certificate belong to the same certificate chain, refer to the following examples. It is assumed that the hub device is the hub-01 device in FIG. 1, and the spoke device is the spoke-01 device in FIG. 1. Digital certificates locally stored by the hub-01 device include a local CA digital certificate, a cascading CA digital certificate 1, a cascading CA digital certificate 2, and a root CA digital certificate. In addition, the digital certificates locally stored by the hub-01 device further include an association relationship among the foregoing certificates, which is referred to as a certificate chain 1. The cascading CA digital certificate 1 is a cascading CA digital certificate in digital certificates of the hub-1 device, and the cascading CA digital certificate 2 is a local CA digital certificate in the digital certificates of the hub-1 device. Digital certificates sent by the spoke-01 device and received by the hub-01 device include the local CA digital certificate, the cascading CA digital certificate 1, the cascading CA digital certificate 2, a cascading CA digital certificate 3, and the root CA digital certificate. In addition, the digital certificates sent by the spoke-01 device further include an association relationship among the foregoing certificates, which is referred to as a certificate chain 2. The cascading CA digital certificate 3 is the local CA digital certificate in the digital certificates of the hub-01 device. The hub-01 device may determine that the certificate chain 1 and the certificate chain 2 match each other, and therefore, determine that the certificate chain 1 and the certificate chain 2 belong to a same certificate chain.

S104. The second network device sends a first NHRP registration reply message to the first network device, where the first NHRP registration reply message is used to indicate that the digital certificate authentication performed by the second network device on the first network device succeeds.

S105. The first network device receives the first NHRP registration reply message sent by the second network device.

For example, after determining that the digital certificate authentication performed by the hub device on the spoke device succeeds, the hub device may send the first NHRP registration reply message to the spoke device. The first NHRP registration reply message is used to indicate that the digital certificate authentication performed by the hub device on the spoke device succeeds. Specifically, the first NHRP registration reply message includes an identifier indicating that the digital certificate authentication succeeds. For example, when the identifier indicating that the digital certificate authentication succeeds is set to 1, it indicates that the hub device determines that the digital certificate authentication performed by the hub device on the spoke device succeeds. For a format of the first NHRP registration reply message, refer to FIG. 4. For example, the first NHRP registration reply message includes a fixed part field, a mandatory part field, and an authentication extension field, and the authentication extension field is used to carry the identifier indicating that the digital certificate authentication succeeds.

The spoke device receives the first NHRP registration reply message, and determines, by obtaining a value of the identifier indicating that the digital certificate authentication succeeds, that the digital certificate authentication performed by the hub device on the spoke device succeeds. After the digital certificate authentication succeeds, the spoke device and the hub device start to transmit data traffic.

According to the foregoing implementation, in the NHRP network, the spoke device sends the NHRP registration request message to the hub device. The NHRP registration request message is used by the spoke device to request the digital certificate authentication from the hub device. After the digital certificate authentication succeeds, the spoke device receives the NHRP registration reply message sent by the hub device. Therefore, the spoke device and the hub device perform authentication by using a PKI certificate. This helps reduce workload of authentication configuration and improve authentication security.

According to the description of the foregoing implementation, the first network device may initiate a digital certificate authentication request to the second network device, and obtain a corresponding reply message. Optionally, after the second network device determines that the digital certificate authentication performed by the second network device on the first network device succeeds, the second network device may continue to initiate a digital certificate authentication request to the first network device. To be specific, the method further includes the following steps.

S106. The second network device sends a second NHRP registration request message to the first network device. The second NHRP registration request message is used to request the first network device to perform digital certificate authentication on the second network device. The second NHRP registration request message includes second PKI certificate information.

For example, after processing a digital certificate authentication request of the spoke device, the hub device may further send the second NHRP registration request message to the spoke device. The second NHRP registration request message is used by the hub device to request the digital certificate authentication from the spoke device, and the second NHRP registration request message includes the second PKI certificate information. For specific implementations of the second NHRP registration request message and the second PKI certificate information, refer to the implementations of the first NHRP registration request message and the first PKI certificate information in S101. Details are not described herein again.

In a possible implementation, after the hub device processes the digital certificate authentication request of the spoke device, the hub device may send the first NHRP registration reply message to the spoke device, and the hub device further sends the second NHRP registration request message to the spoke device.

In another possible implementation, the second NHRP registration request message is the first NHRP registration reply message. To be specific, after the hub device processes the digital certificate authentication request of the spoke device, the hub device no longer sends a new NHRP registration request message to the spoke device, but adds the second PKI certificate information to the first NHRP registration reply message. In this way, the first NHRP registration reply message includes the second PKI certificate information and the identifier indicating that the digital certificate authentication succeeds. For example, the second PKI certificate information includes a second digital certificate, a second digital signature, and a second public key. The first NHRP registration reply message may include a second authentication extension field and a second certificate extension field. Optionally, the second authentication extension field includes the second digital signature and the identifier indicating that the digital certificate authentication succeeds. The second certificate extension field includes the second digital certificate and the second public key. In this implementation, the amount of signaling between the hub device and the spoke device can be reduced, and network bandwidth usage can be reduced.

S107. The first network device receives the second NHRP registration request message sent by the second network device.

S108. The first network device determines, based on the second PKI certificate information, that the digital certificate authentication performed on the second network device succeeds.

For example, after receiving the second NHRP registration request message, the spoke device obtains the second PKI certificate information from the second NHRP registration request message. The spoke device determines, based on the second PKI certificate information, whether the digital certificate authentication performed by the spoke device on the hub device succeeds. For a specific implementation in which the spoke device receives the second NHRP registration request message and determines, based on the second PKI certificate information, that the digital certificate authentication performed on the hub device succeeds, refer to the explanations of S102 and S103. Details are not described herein again.

S109. The first network device sends a second NHRP registration reply message to the second network device. The second NHRP registration reply message is used to indicate that the digital certificate authentication performed by the first network device on the second network device succeeds.

S110. The second network device receives the second NHRP registration reply message sent by the first network device.

For example, after determining that the digital certificate authentication performed by the spoke device on the hub device succeeds, the spoke device may send the second NHRP registration reply message to the hub device. The hub device receives the second NHRP registration reply message. For a specific implementation of the second NHRP registration reply message, refer to the explanations of S104 and S105. Details are not described herein again.

According to the foregoing implementation, in the NHRP network, after the digital certificate authentication performed by the hub device on the spoke device succeeds, the hub device continues to request digital certificate authentication from the spoke device. This further improves authentication security.

FIG. 5 is a schematic structural diagram of a first network device 1000 according to an embodiment of this application. The first network device 1000 shown in FIG. 5 may perform corresponding steps that are performed by the first network device in the method in the foregoing embodiment. The first network device 1000 is deployed in an NHRP network, and the NHRP network further includes a second network device. As shown in FIG. 5, the first network device 1000 includes a sending unit 1002, a processing unit 1004, and a receiving unit 1006.

The processing unit 1004 is configured to generate a first NHRP registration request message. The first NHRP registration request message is used to request the second network device to perform digital certificate authentication on the first network device, and the first NHRP registration request message includes first PKI certificate information.

The sending unit 1002 is configured to send the first NHRP registration request message to the second network device.

The receiving unit 1006 is configured to receive a first NHRP registration reply message sent by the second network device. The first NHRP registration reply message is used to indicate that the digital certificate authentication performed by the second network device on the first network device succeeds.

Optionally, the first PKI certificate information includes a first digital certificate, a first digital signature, and a first public key. The first NHRP registration request message includes a first authentication extension field and a first certificate extension field. The first authentication extension field includes the first digital signature, and the first certificate extension field includes the first digital certificate and the first public key. The processing unit 1004 is further configured to:

determine a first digest based on a fixed part field and a mandatory part field, where the first NHRP registration request message includes the fixed part field and the mandatory part field; and encrypt the first digest by using a first private key, to obtain the first digital signature, where the first private key is symmetric to the first public key.

Optionally, the receiving unit 1006 is further configured to receive a second NHRP registration request message sent by the second network device. The second NHRP registration request message is used to request the first network device to perform digital certificate authentication on the second network device, and the second NHRP registration request message includes second PKI certificate information. The processing unit 1004 is further configured to determine, based on the second PKI certificate information, that the digital certificate authentication performed on the second network device succeeds. The sending unit 1002 is further configured to send a second NHRP registration reply message to the second network device. The second NHRP registration reply message is used to indicate that the digital certificate authentication performed by the first network device on the second network device succeeds.

Optionally, the second PKI certificate information includes a second digital certificate, a second digital signature, and a second public key. When the processing unit 1004 is configured to determine, based on the second PKI certificate information, that the digital certificate authentication performed on the second network device succeeds, the processing unit 1004 is specifically configured to:

determine a second digest based on a fixed part field and a mandatory part field that are carried in the second NHRP registration request message;

decrypt the second digital signature based on the second public key, to obtain a third digest; and determine that the second digest is the same as the third digest, and determine that the second digital certificate included in the second PKI certificate information and the first digital certificate stored in the first network device belong to a same certificate chain.

Optionally, the second NHRP registration request message includes a second authentication extension field and a second certificate extension field. The second authentication extension field includes the second digital signature, and the second certificate extension field includes the second digital certificate and the second public key.

Optionally, the second NHRP registration request message and the first NHRP registration reply message are a same message.

The first network device shown in FIG. 5 may perform corresponding steps that are performed by the first network device in the method in the foregoing embodiment. In an NHRP network scenario, digital certificate authentication is performed between a spoke device and a hub device by using a PKI certificate. The spoke device and the hub device automatically generate local digital certificates and corresponding certificate chains based on a digital certificate issued by a PKI certificate server. This reduces workload of authentication configuration. In addition, the spoke device and the hub device may process an NHRP registration request message through certificate chain matching and encryption and decryption. This improves authentication security. In addition, when a topology of the NHRP network changes, the spoke device and the hub device do not need to be reconfigured.

Figure 6:
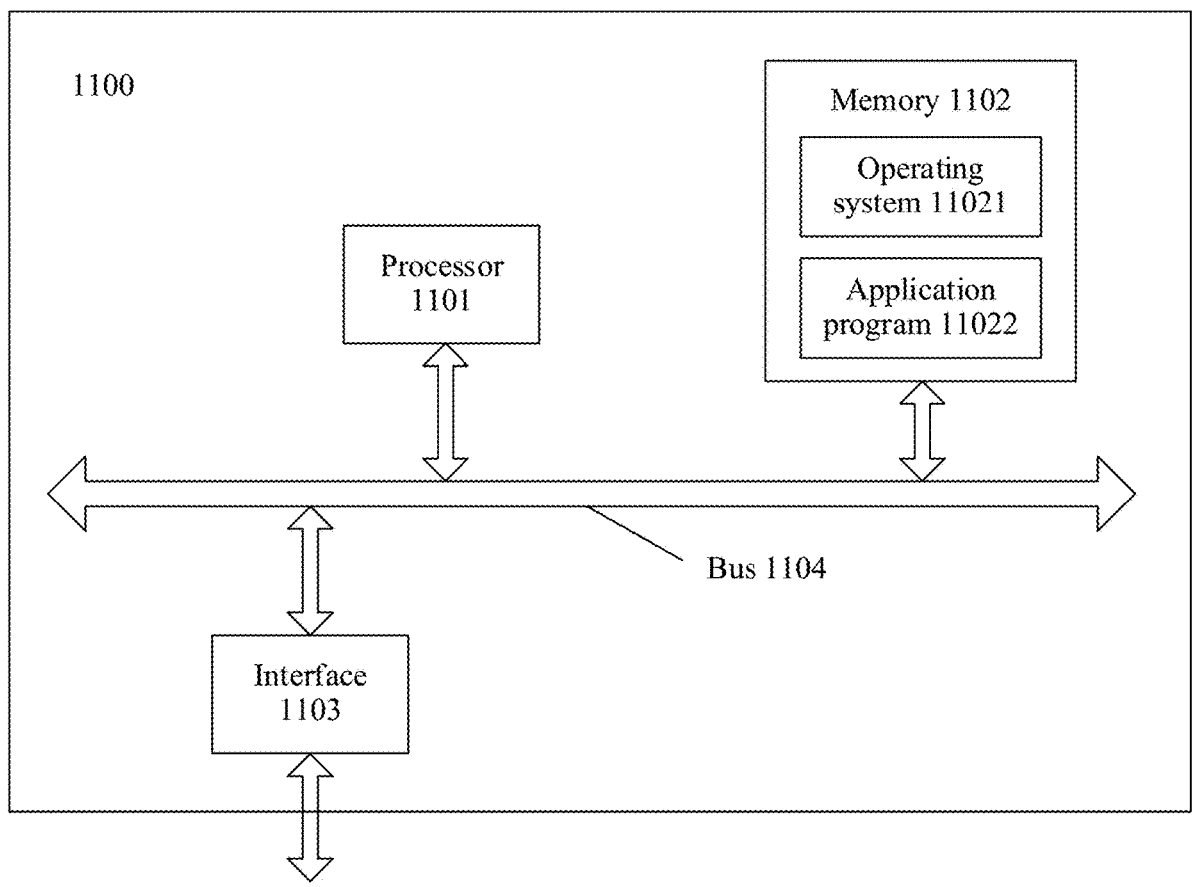
FIG. 6 is a schematic diagram of a hardware structure of a first network device according to an embodiment of this application.

FIG. 6 is a schematic diagram of a hardware structure of a first network device 1100 according to an embodiment of this application. The first network device 1100 shown in FIG. 6 may perform corresponding steps that are performed by the first network device in the method in the foregoing embodiment.

As shown in FIG. 6, the first network device 1100 includes a processor 1101, a memory 1102, an interface 1103, and a bus 1104. The interface 1103 may be implemented in a wireless or wired manner, and may be specifically a network adapter. The processor 1101, the memory 1102, and the interface 1103 are connected by using the bus 1104.

The interface 1103 may include a transmitter and a receiver, and is configured to send and receive information between the first network device and the second network device in the foregoing embodiments. For example, the interface 1103 is configured to support to send a first NHRP registration request message to the second network device, and is further configured to support to receive a first NHRP registration reply message sent by the second network device. For example, the interface 1103 is configured to support processes of S101 and S105 in FIG. 2. The processor 1101 is configured to perform processing performed by the first network device in the foregoing embodiments. For example, the processor 1101 is configured to generate the first NHRP registration request message, and/or is configured to perform another process in the technology described in this specification. The memory 1102 includes an operating system 11021 and an application program 11022, and is configured to store a program, code, or an instruction. When executing the program, code, or instruction, the processor or a hardware device may complete a processing process of the first network device in the method embodiment. Optionally, the memory 1102 may include a read-only memory (ROM) and a random access memory (RAM). The ROM includes a basic input/output system (BIOS) or an embedded system, and the RAM includes an application program and an operating system. When the first network device 1100 needs to initialize, a bootloader in the BIOS or the embedded system that is built into the ROM is used to boot a system to start, and boot the first network device 1100 to enter a normal running state. After entering the normal running state, the first network device 1100 runs the application program and the operating system in the RAM, to complete the processing process of the first network device in the method embodiment.

It may be understood that FIG. 6 shows merely a simplified design of the first network device 1100. In actual application, the first network device may include any quantity of interfaces, processors, or memories.

Figure 7:
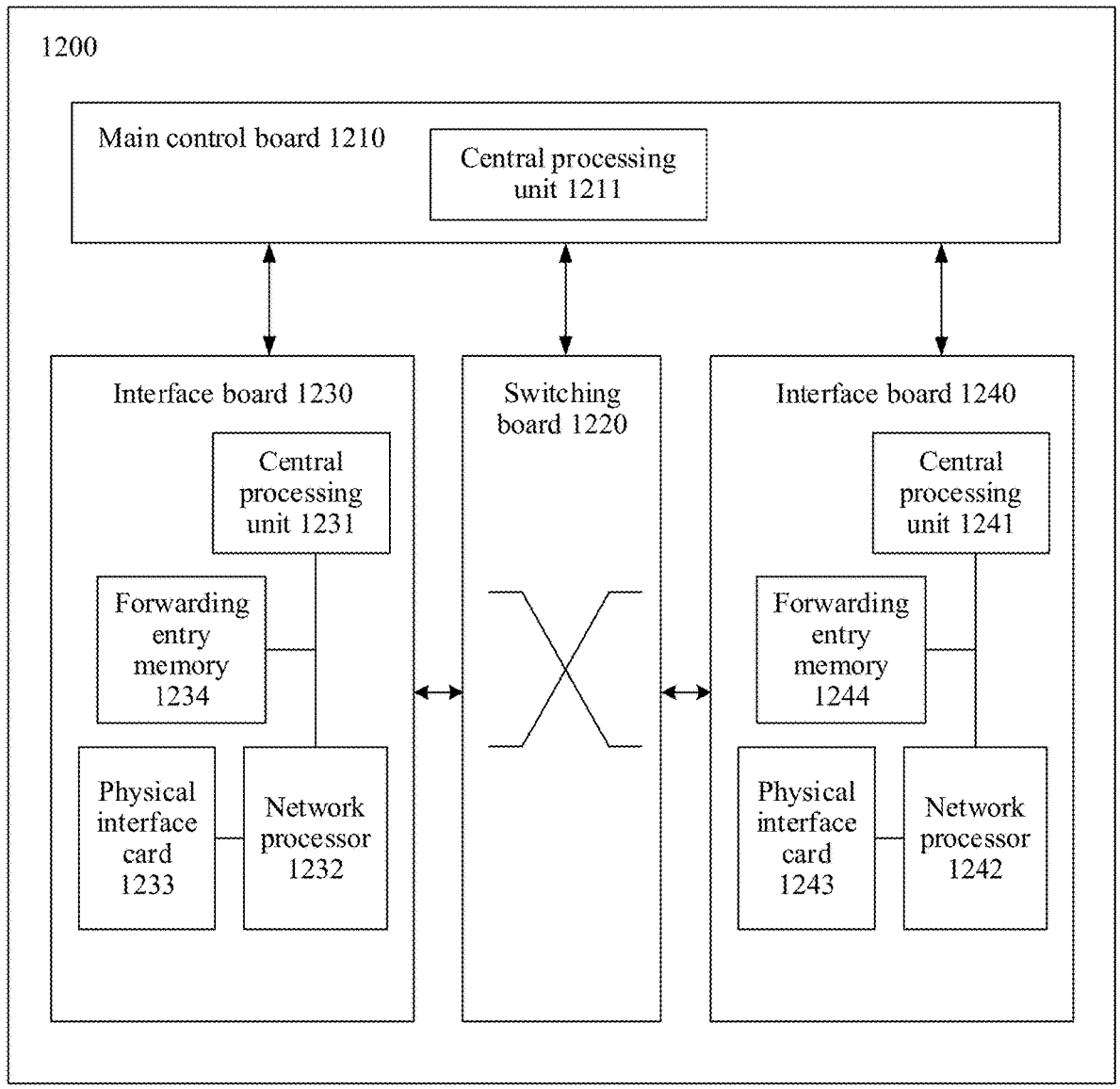
FIG. 7 is a schematic diagram of a hardware structure of another first network device according to an embodiment of this application.

FIG. 7 is a schematic diagram of a hardware structure of another first network device 1200 according to an embodiment of this application. The first network device 1200 shown in FIG. 7 may perform corresponding steps that are performed by the first network device in the method in the foregoing embodiment.

As shown in FIG. 7, the first network device 1200 includes a main control board 1210, an interface board 1230, a switching board 1220, and an interface board 1240. The main control board 1210, the interface board 1230, the interface board 1240, and the switching board 1220 are connected to a system backboard by using a system bus for interworking. The main control board 1210 is configured to complete functions such as system management, device maintenance, and protocol processing. The switching board 1220 is configured to complete data exchange between interface boards (the interface board is also referred to as a line card or a service board). The interface board 1230 and the interface board 1240 are configured to: provide various service interfaces (for example, a POS interface, a GE interface, and an ATM interface), and forward a data packet.

The interface board 1230 may include a central processing unit 1231, a forwarding entry memory 1234, a physical interface card 1233, and a network processor 1232. The central processing unit 1231 is configured to: control and manage the interface board, and communicate with a central processing unit on the main control board. The forwarding entry memory 1234 is configured to store a forwarding entry. The physical interface card 1233 is configured to receive and send traffic. The network processor 1232 is configured to control, based on the forwarding entry, the physical interface card 1233 to receive and send the traffic.

Specifically, the physical interface card 1233 is configured to: send a first NHRP registration request message to the second network device, and receive a first NHRP registration reply message sent by the second network device.

A central processing unit 1211 is configured to: generate the first NHRP registration request message, and trigger the physical interface card 1233 to send the first NHRP registration request message to the second network device.

The central processing unit 1211 is further configured to process the first NHRP registration reply message.

The central processing unit 1211 sends the first NHRP registration request message to the physical interface card 1233 through the central processing unit 1231. The physical interface card 1233 sends the first NHRP registration request message to the second network device.

The central processing unit 1231 is further configured to control the network processor 1232 to obtain the forwarding entry in the forwarding entry memory 1234, and the central processing unit 1231 is further configured to control the network processor 1232 to send and receive the traffic by using the physical interface card 1233.

It should be understood that operations on the interface board 1240 are consistent with the operations on the interface board 1230 in this embodiment of the present application. For brevity, details are not described again. It should be understood that the first network device 1200 in this embodiment may be corresponding to the functions and/or the various implemented steps in the foregoing method embodiment. Details are not described herein again.

In addition, it should be noted that there may be one or more main control boards. When there are a plurality of main control boards, a primary main control board and a secondary main control board may be included. There may be one or more interface boards, and a first network device with a stronger data processing capability provides more interface boards. There may also be one or more physical interface cards on the interface board. There may be no switching board or there may be one or more switching boards. When there are a plurality of switching boards, the switching boards may jointly implement load sharing and redundancy backup. In a centralized forwarding architecture, the first network device may need no switching board, and the interface board undertakes a service data processing function in an entire system. In a distributed forwarding architecture, the first network device may have at least one switching board, and implement data exchange between a plurality of interface boards by using the switching board, to provide large-capacity data exchange and a large-capacity data processing capability. Therefore, a data access and processing capability of the first network device in the distributed architecture is better than that of the device in the centralized architecture. Which architecture is used depends on a specific networking deployment scenario. This is not limited herein.

Figure 8:
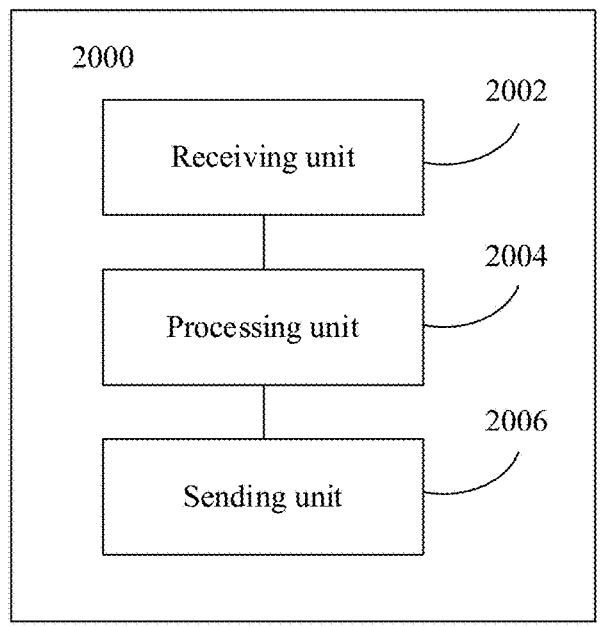
FIG. 8 is a schematic structural diagram of a second network device according to an embodiment of this application.

FIG. 8 is a schematic structural diagram of a second network device 2000 according to an embodiment of this application. The second network device 2000 shown in FIG. 8 may perform corresponding steps that are performed by the second network device in the method in the foregoing embodiment. The second network device is deployed in an NHRP network, and the NHRP network further includes a first network device. As shown in FIG. 8, the second network device 2000 includes a receiving unit 2002, a processing unit 2004, and a sending unit 2006.

The receiving unit 2002 is configured to receive a first NHRP registration request message sent by the first network device. The first NHRP registration request message is used to request the second network device to perform digital certificate authentication on the first network device, and the first NHRP registration request message includes first PKI certificate information.

The processing unit 2004 is configured to determine, based on the first PKI certificate information, that the digital certificate authentication performed on the first network device succeeds.

The sending unit 2006 is configured to send a first NHRP registration reply message to the first network device. The first NHRP registration reply message is used to indicate that the digital certificate authentication performed by the second network device on the first network device succeeds.

Optionally, the first PKI certificate information includes a first digital certificate, a first digital signature, and a first public key. The first NHRP registration request message includes a first authentication extension field and a first certificate extension field. The first authentication extension field includes the first digital signature, and the first certificate extension field includes the first digital certificate and the first public key. When the processing unit 2004 is configured to determine, based on the first PKI certificate information, that the digital certificate authentication performed on the first network device succeeds, the processing unit 2004 is specifically configured to:

determine a first digest based on a fixed part field and a mandatory part field that are carried in the first NHRP registration request message;

decrypt the first digital signature based on the first public key, to obtain a second digest; and determine that the first digest is the same as the second digest, and determine that the first digital certificate included in the first PKI certificate information and a second digital certificate stored in the second network device belong to a same certificate chain.

Optionally, the sending unit 2006 is further configured to send a second NHRP registration request message to the first network device. The second NHRP registration request message is used to request the first network device to perform digital certificate authentication on the second network device, and the second NHRP registration request message includes second PKI certificate information. The receiving unit 2002 is further configured to receive a second NHRP registration reply message sent by the first network device. The second NHRP registration reply message is used to indicate that the digital certificate authentication performed by the first network device on the second network device succeeds.

Optionally, the second NHRP registration request message and the first NHRP registration reply message are a same message.

The second network device shown in FIG. 8 may perform corresponding steps that are performed by the second network device in the method in the foregoing embodiment. In an NHRP network scenario, digital certificate authentication is performed between a spoke device and a hub device by using a PKI certificate. The spoke device and the hub device automatically generate local digital certificates and corresponding certificate chains based on a digital certificate issued by a PKI certificate server. This reduces workload of authentication configuration. In addition, the spoke device and the hub device may process an NHRP registration request message through certificate chain matching and encryption and decryption. This improves authentication security. In addition, when a topology of the NHRP network changes, the spoke device and the hub device do not need to be reconfigured.

Figure 9:
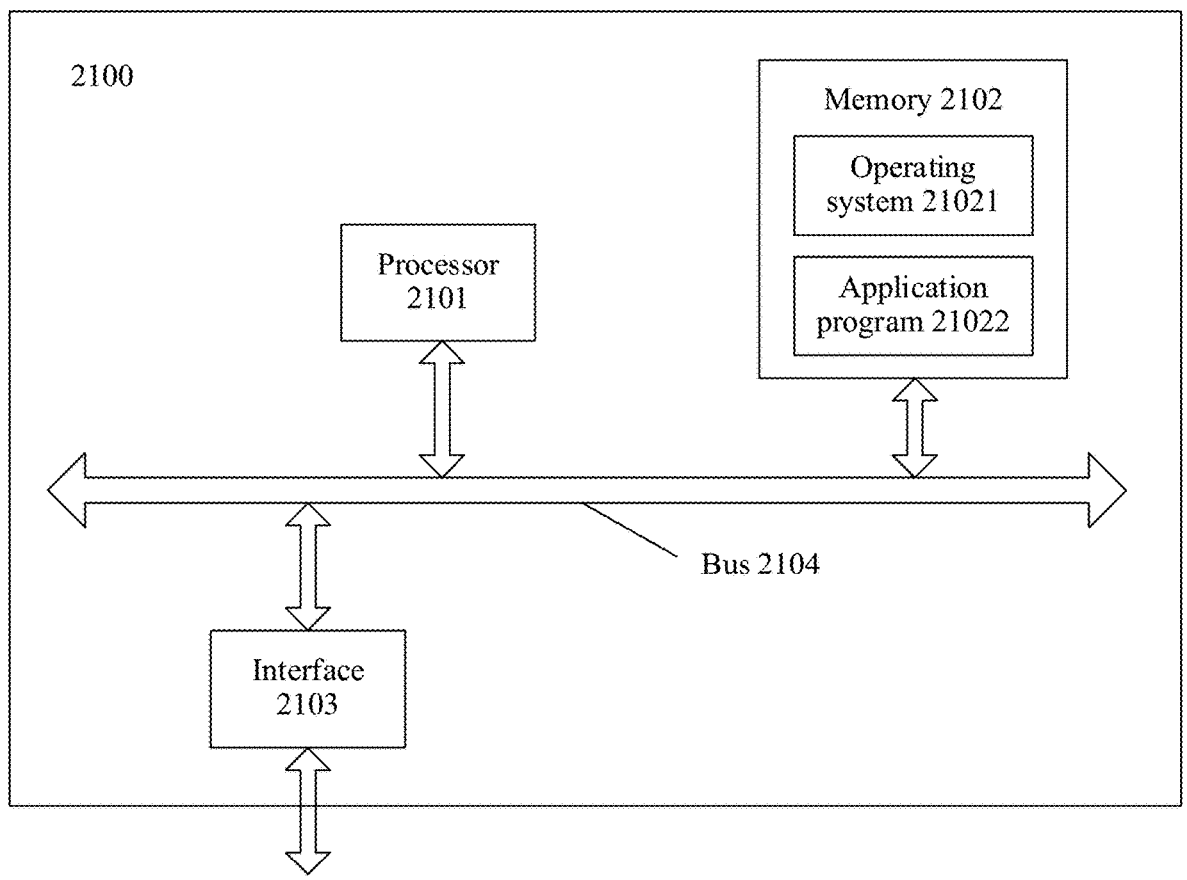
FIG. 9 is a schematic diagram of a hardware structure of a second network device according to an embodiment of this application.

FIG. 9 is a schematic diagram of a hardware structure of a second network device 2100 according to an embodiment of this application. The second network device 2100 shown in FIG. 9 may perform corresponding steps that are performed by the second network device in the method in the foregoing embodiment.

As shown in FIG. 9, the second network device 2100 includes a processor 2101, a memory 2102, an interface 2103, and a bus 2104. The interface 2103 may be implemented in a wireless or wired manner, and may be specifically a network adapter. The processor 2101, the memory 2102, and the interface 2103 are connected by using the bus 2104.

The interface 2103 may include a transmitter and a receiver, and is configured to send and receive information between the second network device and the first network device in the foregoing embodiments. For example, the interface 2103 is configured to send a first NHRP registration reply message to the first network device, and is further configured to receive a first NHRP registration request message sent by the first network device. For example, the interface 2103 is configured to support the processes of S102 and S104 in FIG. 2. The processor 2101 is configured to perform the processing performed by the second network device in the foregoing embodiments. For example, the processor 2101 is configured to process the first NHRP registration request message, and is further configured to generate the first NHRP registration reply message; and/or is configured to perform another process in the technology described in this specification. For example, the processor 2101 is configured to support a process of S103 in FIG. 2. The memory 2102 includes an operating system 21021 and an application program 21022, and is configured to store a program, code, or an instruction. When executing the program, code, or instruction, the processor or a hardware device may complete a processing process of the second network device in the method embodiment. Optionally, the memory 2102 may include a read-only memory (ROM) and a random access memory (RAM). The ROM includes a basic input/output system (BIOS) or an embedded system, and the RAM includes an application program and an operating system. When the second network device 2100 needs to be initialized, a bootloader in the BIOS or the embedded system that is built into the ROM is used to boot a system to start, and boot the second network device 2100 to enter a normal running state. After entering the normal running state, the second network device 2100 runs the application program and the operating system in the RAM, to complete the processing process of the second network device in the method embodiment.

It may be understood that FIG. 9 shows merely a simplified design of the second network device 2100. In actual application, the second network device may include any quantity of interfaces, processors, or memories.

Figure 10:
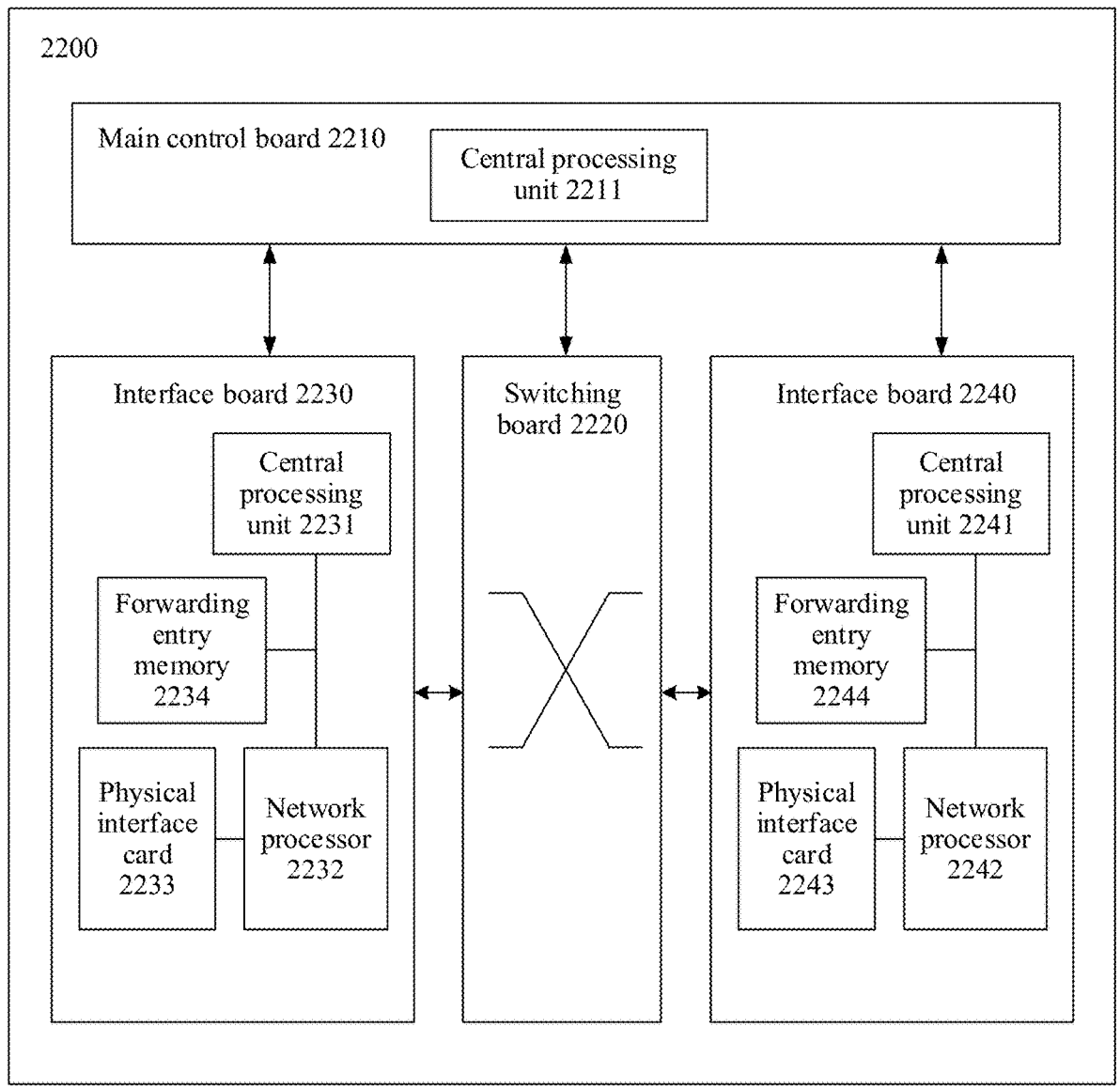
FIG. 10 is a schematic diagram of a hardware structure of another second network device according to an embodiment of this application.

FIG. 10 is a schematic diagram of a hardware structure of another second network device 2200 according to an embodiment of this application. The second network device 2200 shown in FIG. 10 may perform corresponding steps that are performed by the second network device in the method in the foregoing embodiment.

As shown in FIG. 10, the second network device 2200 includes a main control board 2210, an interface board 2230, a switching board 2220, and an interface board 2240. The main control board 2210, the interface board 2230, the interface board 2240, and the switching board 2220 are connected to a system backboard by using a system bus for interworking. The main control board 2210 is configured to complete functions such as system management, device maintenance, and protocol processing. The switching board 2220 is configured to complete data exchange between interface boards (the interface board is also referred to as a line card or a service board). The interface board 2230 and the interface board 2240 are configured to: provide various service interfaces (for example, a POS interface, a GE interface, and an ATM interface), and forward a data packet.

The interface board 2230 may include a central processing unit 2231, a forwarding entry memory 2234, a physical interface card 2233, and a network processor 2232. The central processing unit 2231 is configured to: control and manage the interface board, and communicate with a central processing unit on the main control board. The forwarding entry memory 2234 is configured to store a forwarding entry. The physical interface card 2233 is configured to receive and send traffic. The network processor 2232 is configured to control, based on the forwarding entry, the physical interface card 2233 to receive and send the traffic.

Specifically, the physical interface card 2233 is configured to: receive a first NHRP registration request message sent by the first network device, or send a first NHRP registration reply message to the first network device.

A central processing unit 2211 is configured to process the first NHRP registration request message, and is further configured to generate the first NHRP registration reply message.

The central processing unit 2211 sends the first NHRP registration reply message to the physical interface card 2233 through the central processing unit 2231. The physical interface card 2233 sends the first NHRP registration reply message to the first network device.

The central processing unit 2231 is further configured to control the network processor 2232 to obtain the forwarding entry in the forwarding entry memory 2234, and the central processing unit 2231 is further configured to control the network processor 2232 to send and receive the traffic by using the physical interface card 2233.

It should be understood that operations on the interface board 2240 are consistent with the operations on the interface board 2230 in this embodiment of the present application. For brevity, details are not described again. It should be understood that the second network device 2200 in this embodiment may corresponds to the functions and/or the various implemented steps in the foregoing method embodiment. Details are not described herein again.

In addition, it should be noted that there may be one or more main control boards. When there are a plurality of main control boards, a primary main control board and a secondary main control board may be included. There may be one or more interface boards, and a second network device with a stronger data processing capability provides more interface boards. There may also be one or more physical interface cards on the interface board. There may be no switching board or there may be one or more switching boards. When there are a plurality of switching boards, the switching boards may jointly implement load sharing and redundancy backup. In a centralized forwarding architecture, the second network device may not need a switching board, and the interface board undertakes a service data processing function in an entire system. In a distributed forwarding architecture, the second network device may have at least one switching board, and implement data exchange between a plurality of interface boards by using the switching board, to provide large-capacity data exchange and a large-capacity data processing capability. Therefore, a data access and processing capability of the second network device in the distributed architecture is better than that of the device in the centralized architecture. Which architecture is used depends on a specific networking deployment scenario. This is not limited herein.

In addition, an embodiment of this application provides a computer storage medium, configured to store a computer software instruction used by the foregoing first network device. The computer software instruction includes a program designed for performing the foregoing method embodiment.

In addition, an embodiment of this application provides a computer storage medium, configured to store a computer software instruction used by the foregoing second network device. The computer software instruction includes a program designed for performing the foregoing method embodiment.

An embodiment of this application further includes an NHRP network system. The NHRP network system includes a first network device and a second network device. The first network device is the first network device in FIG. 5, FIG. 6, or FIG. 7. The second network device is the second network device in FIG. 8, FIG. 9, or FIG. 10.

The method or algorithm steps described with reference to the content disclosed in this application may be implemented by hardware, or may be implemented by one or more processors executing a software instruction. The software instruction may include a corresponding software module. The software module may be stored in a RAM memory, a flash memory, a ROM memory, an EPROM memory, an EEPROM memory, a register, a hard disk, a removable hard disk, a CD-ROM, or a storage medium of any other form well-known in the art. For example, the storage medium is coupled to the processor, so that the processor can read information from the storage medium, and write information into the storage medium. Certainly, the storage medium may alternatively be a component of the processor. The processor and the storage medium may be located in an ASIC. In addition, the ASIC may be located in user equipment. Certainly, the processor and the storage medium may exist in the user equipment as discrete components.

A person skilled in the art should be aware that in the foregoing one or more examples, the functions described in this application may be implemented by hardware, software, firmware, or any combination thereof. When the functions are implemented by software, the functions may be stored in a computer-readable medium or transmitted as one or more instructions or code in a computer-readable medium. The computer-readable medium includes a computer storage medium and a communications medium, where the communications medium includes any medium that facilitates transmission of a computer program from one place to another. The storage medium may be any available medium accessible to a general-purpose computer or a dedicated computer.

The objectives, technical solutions, and beneficial effects of this application are further described in detail in the foregoing specific implementations. It should be understood that the foregoing descriptions are merely specific implementations of this application.

What is claimed is:

1. An authentication method, wherein the authentication method is applied to a next hop resolution protocol (NHRP) network, the NHRP network comprises a first network device and a second network device, and the method comprises:
   determining, by the first network device, a first digest based on a fixed part field and a mandatory part field;
   encrypting, by the first network device, the first digest by using a first private key, to obtain the first digital signature, wherein the first private key is symmetric to a first public key;
   sending, by the first network device, a first NHRP registration request message to the second network device, wherein the first NHRP registration request message comprises the fixed part field and the mandatory part field and is used to request the second network device to perform digital certificate authentication on the first network device, and the first NHRP registration request message comprises first public key infrastructure (PKI) certificate information; and
   receiving, by the first network device, a second NHRP registration request message sent by the second network device, wherein the second NHRP registration request message is used to request the first network device to perform digital certificate authentication on the second network device, and the second NHRP registration request message comprises second PKI certificate information, wherein the second PKI certificate information comprises a second digital certificate, a second digital signature, and a second public key;
   determining, by the first network device, a second digest based on a fixed part field and a mandatory part field that are carried in the second NHRP registration request message;
   decrypting, by the first network device, the second digital signature based on the second public key, to obtain a third digest; and
   determining, by the first network device, that the second digest is the same as the third digest, and determining that the second digital certificate comprised in the second PKI certificate information and the first PKI certificate information stored in the first network device belong to a same certificate chain.

2. The method according to claim 1, wherein the first PKI certificate information comprises a first digital certificate, the first digital signature, and the first public key, the first NHRP registration request message comprises a first authentication extension field and a first certificate extension field, the first authentication extension field comprises the first digital signature, the first certificate extension field comprises the first digital certificate and the first public key, and before the sending, by the first network device, of the first NHRP registration request message to the second network device, the method further comprises:
   receiving, by the first network device, a first NHRP registration reply message sent by the second network device, wherein the first NHRP registration reply message indicates that the digital certificate authentication performed by the second network device on the first network device succeeds.

3. The method according to claim 2, wherein the method further comprises:
   sending, by the first network device, a second NHRP registration reply message to the second network device, wherein the second NHRP registration reply message indicates that the digital certificate authentication performed by the first network device on the second network device succeeds.

4. The method according to claim 1, wherein the second NHRP registration request message comprises a second authentication extension field and a second certificate extension field, the second authentication extension field comprises the second digital signature, and the second certificate extension field comprises the second digital certificate and the second public key.

5. The method according to claim 3, wherein the second NHRP registration request message and the first NHRP registration reply message are a same message.

6. A first network device, wherein the first network device is in a next hop resolution protocol (NHRP) network, the NHRP network further comprises a second network device, and the first network device comprises:
   a processor, configured to
      determine a first digest based on a fixed part field and a mandatory part field;
      encrypt the first digest by using a first private key, to obtain a first digital signature, wherein the first private key is symmetric to a first public key;
      generate a first NHRP registration request message, wherein the first NHRP registration request message comprises the fixed part field and the mandatory part field and is used to request the second network device to perform digital certificate authentication on the first network device, and the first NHRP registration request message comprises first public key infrastructure (PKI) certificate information;
   a transmitter, configured to send the first NHRP registration request message to the second network device; and
   a receiver, configured to receive a second NHRP registration request message sent by the second network device, wherein the second NHRP registration request message is used to request the first network device to perform digital certificate authentication on the second network device, and the second NHRP registration request message comprises second PKI certificate information wherein the second PKI certificate information comprises a second digital certificate, a second digital signature, and a second public key;
   wherein the processor is further configured to:
      determine a second digest based on a fixed part field and a mandatory part field that are carried in the second NHRP registration request message;
      decrypt the second digital signature based on the second public key, to obtain a third digest; and
      determine that the second digest is the same as the third digest, and determining that the second digital certificate comprised in the second PKI certificate information and the first PKI certificate information stored in the first network device belong to a same certificate chain.

7. The first network device according to claim 6, wherein the first PKI certificate information comprises a first digital certificate, the first digital signature, and the first public key, the first NHRP registration request message comprises a first authentication extension field and a first certificate extension field, the first authentication extension field comprises the first digital signature, the first certificate extension field comprises the first digital certificate and the first public key, and the receiver is further configured to:
receive a first NHRP registration reply message sent by the second network device, wherein the first NHRP registration reply message indicates that the digital certificate authentication performed by the second network device on the first network device succeeds.

8. The first network device according to claim 7, wherein the transmitter is further configured to send a second NHRP registration reply message to the second network device, wherein the second NHRP registration reply message indicates that the digital certificate authentication performed by the first network device on the second network device succeeds.

9. The first network device according to claim 8, wherein the second NHRP registration request message comprises a second authentication extension field and a second certificate extension field, the second authentication extension field comprises the second digital signature, and the second certificate extension field comprises the second digital certificate and the second public key.

10. The first network device according to claim 8, wherein the second NHRP registration request message and the first NHRP registration reply message are a same message.

11. A second network device, wherein the second network device is in a next hop resolution protocol (NHRP) network, the NHRP network further comprises a first network device, and the second network device comprises:
a receiver, configured to receive a first NHRP registration request message sent by the first network device, wherein the first NHRP registration request message is used to request the second network device to perform digital certificate authentication on the first network device, and the first NHRP registration request message comprises first public key infrastructure (PKI) certificate information;
a processor, configured to determine, based on the first PKI certificate information, that the digital certificate authentication performed on the first network device succeeds; and
a transmitter, configured to send a first NHRP registration reply message to the first network device, wherein the first NHRP registration reply message indicates that the digital certificate authentication performed by the second network device on the first network device succeeds;
wherein the first PKI certificate information comprises a first digital certificate, a first digital signature, and a first public key, the first NHRP registration request message comprises a first authentication extension field and a first certificate extension field, the first authentication extension field comprises the first digital signature, the first certificate extension field comprises the first digital certificate and the first public key, and when the processor is configured to determine, based on the first PKI certificate information, that the digital certificate authentication performed on the first network device succeeds, the processor is specifically configured to:
determine a first digest based on a fixed part field and a mandatory part field that are carried in the first NHRP registration request message;
decrypt the first digital signature based on the first public key, to obtain a second digest; and
determine that the first digest is the same as the second digest, and determine that the first digital certificate comprised in the first PKI certificate information and a second digital certificate stored in the second network device belong to a same certificate chain.

12. The second network device according to claim 11, wherein
the transmitter is further configured to send a second NHRP registration request message to the first network device, wherein the second NHRP registration request message is used to request the first network device to perform digital certificate authentication on the second network device, and the second NHRP registration request message comprises second PKI certificate information; and
the receiver is further configured to receive a second NHRP registration reply message sent by the first network device, wherein the second NHRP registration reply message indicates that the digital certificate authentication performed by the first network device on the second network device succeeds.

13. The second network device according to claim 12, wherein the second NHRP registration request message and the first NHRP registration reply message are a same message.

* * * * *